US012285952B2

(12) United States Patent
Gu et al.

(10) Patent No.: US 12,285,952 B2
(45) Date of Patent: Apr. 29, 2025

(54) CARTRIDGE TEST DEVICE, CARTRIDGE COMPONENT, AND CARTRIDGE COMPONENT TEST METHOD

(71) Applicant: HANGZHOU CHIPJET TECHNOLOGY CO., LTD., Hangzhou (CN)

(72) Inventors: Haining Gu, Hangzhou (CN); Shan Luo, Hangzhou (CN)

(73) Assignee: HANGSHOU CHIP JET TECHNOLOGY CO., LTD., Hangzhou (CN)

( * ) Notice: Subject to any disclaimer, the term of this patent is extended or adjusted under 35 U.S.C. 154(b) by 226 days.

(21) Appl. No.: 17/861,262

(22) Filed: Jul. 11, 2022

(65) Prior Publication Data

US 2022/0339946 A1 Oct. 27, 2022

Related U.S. Application Data

(63) Continuation of application No. PCT/CN2021/072712, filed on Jan. 19, 2021.

(30) Foreign Application Priority Data

Jan. 20, 2020 (CN) ......................... 202010065545.6

(51) Int. Cl.
*B41J 2/175* (2006.01)

(52) U.S. Cl.
CPC ....... *B41J 2/17546* (2013.01); *B41J 2/17503* (2013.01)

(58) Field of Classification Search
CPC .......................... B41J 2/17546; B41J 2/17503
(Continued)

(56) References Cited

U.S. PATENT DOCUMENTS 7,455,381 B2 * 11/2008 Koike ...................... B41J 25/34 347/7
7,719,300 B2 5/2010 Washio et al.
(Continued)

FOREIGN PATENT DOCUMENTS

CN 101590733 A * 12/2009 ............. B41J 2/175
CN 101887103 A * 11/2010
(Continued)

OTHER PUBLICATIONS

China Office Action of 202010065545.6.
International Search Report of PCT/CN2021/072712.
Extended European Search Report of EP21744675.6.

*Primary Examiner* — Peter J Macchiarolo
*Assistant Examiner* — Monica S Young

(57) ABSTRACT

An ink cartridge test device, an ink cartridge component, and an ink cartridge component test method are provided. The ink cartridge component includes an ink cartridge package and ink cartridges accommodated in the ink cartridge package, and the ink cartridge package is provided with openings corresponding to the ink cartridges. The ink cartridge test device includes a device main body, a data transmission apparatus mounted on the device main body and in either or both of electrical connection and signal connection with the device main body, and test heads. The test heads are connected to the device main body and are in either or both of electrical connection and signal connection with the data transmission apparatus. The openings are configured to allow the test heads to be in either or both of electrical connection and signal connection with corresponding ink cartridges.

10 Claims, 4 Drawing Sheets

(58) Field of Classification Search
USPC .......................................................... 73/865.9
See application file for complete search history.

(56) References Cited

U.S. PATENT DOCUMENTS

| | | | | |
|---|---|---|---|---|
| 2008/0224723 | A1* | 9/2008 | Washio | G01R 31/2891 324/758.01 |
| 2009/0085992 | A1* | 4/2009 | Ward | B41J 2/17546 347/86 |
| 2009/0295891 | A1 | 12/2009 | Wanibe | |
| 2015/0260788 | A1* | 9/2015 | Yamada | G01R 31/2893 324/750.25 |

FOREIGN PATENT DOCUMENTS

| | | | | |
|---|---|---|---|---|
| CN | 202083776 | U | * | 12/2011 |
| CN | 102394111 | A | * | 3/2012 |
| CN | 206485052 | U | | 9/2017 |
| CN | 207096925 | U | | 3/2018 |
| CN | 207361007 | U | | 5/2018 |
| CN | 207764354 | U | * | 8/2018 |
| CN | 109501463 | A | | 3/2019 |
| CN | 209141703 | U | * | 7/2019 |
| CN | 209274166 | U | | 8/2019 |
| CN | 111196090 | A | | 5/2020 |
| CN | 211942589 | U | | 11/2020 |
| CN | 114434971 | A | * | 5/2022 |

* cited by examiner

CARTRIDGE TEST DEVICE, CARTRIDGE COMPONENT, AND CARTRIDGE COMPONENT TEST METHOD

CROSS-REFERENCE TO RELATED APPLICATIONS

This application is a continuation of international patent application No. PCT/CN2021/072712 filed on Jan. 19, 2021, which itself claims priority to Chinese patent application No. 202010065545.6, filed on Jan. 20, 2020, titled "CARTRIDGE TEST DEVICE, CARTRIDGE COMPONENT, AND CARTRIDGE COMPONENT TEST METHOD". The contents of the above identified applications are hereby incorporated herein in their entireties by reference.

TECHNICAL FIELD

The present disclosure relates to the field of cartridge test, and in particular, to a cartridge test device, a cartridge component, and a cartridge component test method.

BACKGROUND

A cartridge is an important component of an inkjet printer, and the quality of the cartridge directly affects a printing effect of the inkjet printer. Cartridges are provided with chips, which are stored with relevant information corresponding to the cartridges. In this way, the chips on the cartridges need to be tested so that the cartridges can be installed on the inkjet printer for normal use. At present, in the related art, a cartridge test device tests the chips on the cartridges. Specifically, the cartridge test device contacts and connects with the chips on the cartridges with a spring needle, and then uses a data input apparatus to test the chips. However, when a conventional cartridge test device is in operation, only a single cartridge can be tested, resulting in a relatively low testing efficiency and a relatively high testing cost.

SUMMARY

According to various embodiments of the present disclosure, a cartridge test device configured to test a cartridge component is provided. The cartridge component includes a cartridge package and a plurality of cartridges or a group of cartridges accommodated in the cartridge package, the cartridge package is provided with a plurality of openings corresponding to the plurality of cartridges or the group of cartridges. The cartridge test device includes a device main body, a data transmission apparatus mounted on the device main body and in either or both of electrical connection and signal connection with the device main body, and a plurality of test heads connected to the device main body and in either or both of electrical connection and signal connection with the data transmission apparatus. The plurality of openings are configured to allow the plurality of test heads to reach in and be in either or both of electrical connection and signal connection with corresponding cartridges.

In an embodiment, each of the plurality of test heads includes a fixed bracket, a PCB board fastened to the fixed bracket, and a contact shrapnel electrically connected to the PCB board. Each of the plurality of test heads is capable of being electrically connected to a chip of the cartridge by the contact shrapnel.

In an embodiment, the plurality of the test heads are fixedly connected to the device main body, or a distance between two adjacent test heads is adjustable.

In an embodiment, the cartridge test device further includes a mounting bracket, a guide rail, and a carriage. The guide rail is protruded from the mounting bracket and fixedly connected to the mounting bracket. The carriage is slidably connected to the guide rail, and is capable of driving the cartridge to move along a direction of the guide rail towards the plurality of test heads, enabling a chip of the cartridge to be in either or both of electrical connection and signal connection with a corresponding test head.

In an embodiment, the cartridge test device further includes a position confirmation component provided between the carriage and the device main body. The position confirmation component is in either or both of electrical connection and signal connection with the data transmission apparatus. When the carriage slides until the plurality of test heads are properly in either or both of electrical connection and signal connection with the chip of the cartridge, the position confirmation component is configured to trigger the data transmission apparatus to transfer either or both of data and programs to the chip by the plurality of test heads, or to read either or both of data and programs in the chip by the plurality of test heads.

In an embodiment, the position confirmation component includes a switch lever connected to the carriage and a trigger switch connected to the device main body. When the carriage slides until the plurality of test heads are properly in either or both of electrical connection and signal connection with the chip, the switch lever is capable of triggering the trigger switch, and the trigger switch is capable of transmitting a position signal of the plurality of test heads properly in either or both of electrical connection and signal connection with the chip to the data transmission apparatus.

In an embodiment, the cartridge test device further includes a mounting plate and a fixed base fastened to the mounting plate. The fixed base is configured to locate the cartridge. The device main body is disposed on the mounting plate and movably connected with a sliding plate. The plurality of test heads are fastened to the sliding plate, and the sliding plate is capable of driving the plurality of test heads to move towards the cartridge, enabling the plurality of test heads being in either or both of electrical connection and signal connection with the cartridge.

In an embodiment, the sliding plate is fastened to a guide rod. The device main body is connected to a guide sleeve correspondingly. The guide rod is slidably connected to the guide sleeve. A pushing rod is rotatably connected to the device main body. The pushing rod is connected to the guide rod by a pivot frame, and the pushing rod is capable of driving the sliding plate to move towards the cartridge by the pivot frame and the guide rod.

According to various embodiments of the present disclosure, a cartridge component is further provided. The cartridge component includes a cartridge package and a plurality of cartridges or a group of cartridges accommodated in the cartridge package. The plurality of cartridges or the group of cartridges are tested by the cartridge test device described above. The cartridge test device includes the plurality of test heads, and the plurality of test heads are capable of being in either or both of electrical connection and signal connection with the plurality of cartridges or the group of cartridges respectively.

In an embodiment, the cartridge package is provided with a plurality of openings corresponding to the plurality of cartridges or the group of cartridges, and the plurality of openings are configured to allow the plurality of test heads to reach in and be in electrical connection with corresponding cartridges.

According to various embodiments of the present disclosure, a cartridge component test method is further provided. The cartridge component test method includes the following steps: at step 1, providing the cartridge test device and the cartridge component described above; at step 2, inputting either or both of data and programs required by the plurality of cartridges or the group of cartridges into the data transmission apparatus; at step 3, either or both of driving the cartridge component close to the plurality of test heads and driving the plurality of test heads close to the cartridge component, enabling the plurality of test heads to be in either or both of electrical connection and signal connection with corresponding chips of the plurality of cartridges or the group of cartridges; at step 4, the data transmission apparatus reading or writing either or both of data and programs of corresponding chips of the plurality of cartridges or the group of cartridges by the plurality of test heads; at step 5, either or both of driving the cartridge component away from the plurality of test heads and driving the plurality of test heads away from the cartridge component, enabling the plurality of test heads away from corresponding chips of the plurality of cartridges or the group of cartridges and finishing the test.

In an embodiment, the driving the cartridge component close to the plurality of test heads includes: disposing the cartridge component to the carriage, and driving the carriage to slide on the mounting bracket fastened to the cartridge test device along the guide rail.

In an embodiment, the driving the plurality of test heads close to the cartridge component includes: fixing the cartridge component to the fixed base, enabling the plurality of test heads of the cartridge test device to be fastened to the sliding plate, and driving the sliding plate to move towards the cartridge component.

The cartridge test device, the cartridge component, and the cartridge component test method described above have the following advantages. The cartridge test device is simple in structure and convenient in operation. Because the plurality of test heads on the cartridge test device are in either or both of electrical connection and signal connection with the plurality of cartridges in the cartridge component, when the cartridge test device is in operation, the plurality of cartridges may be simultaneously tested. Therefore, a working efficiency of the cartridge test device for a cartridge testing may be improved and a testing cost may be reduced. Meanwhile, a plurality of cartridges or a group of cartridges of the cartridge component may be matched with the plurality of test heads of the cartridge test device and tested by the cartridge test device without disassembling the cartridge package, thereby further improving a working efficiency of the cartridge test device.

BRIEF DESCRIPTION OF THE DRAWINGS

In order to better describe and explain the embodiments and/or examples of those disclosures disclosed herein, one or more drawings may be referred to. The additional details or examples used to describe the drawings should not be considered as limiting the scope of any of the disclosed disclosures, the currently described embodiments and/or examples, and the best mode of these disclosures currently understood.

Figure 1:
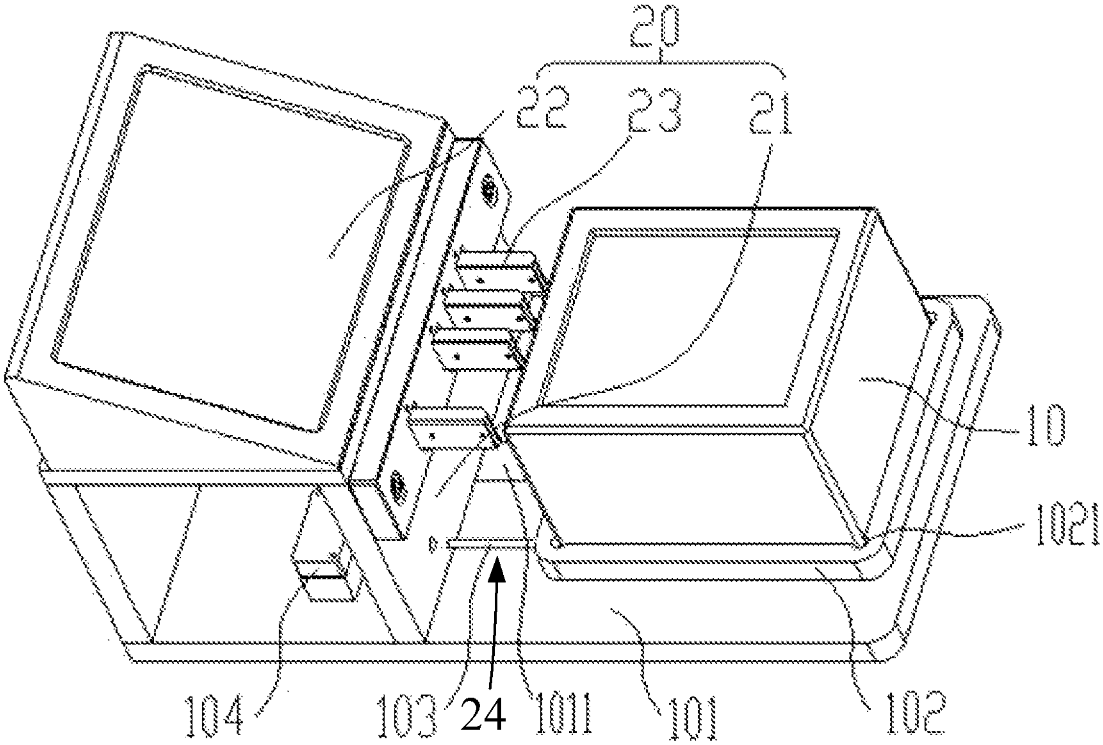
FIG. 1 is a schematic diagram of a cartridge test device of a cartridge component in a first embodiment of the present disclosure.
Figure 2:
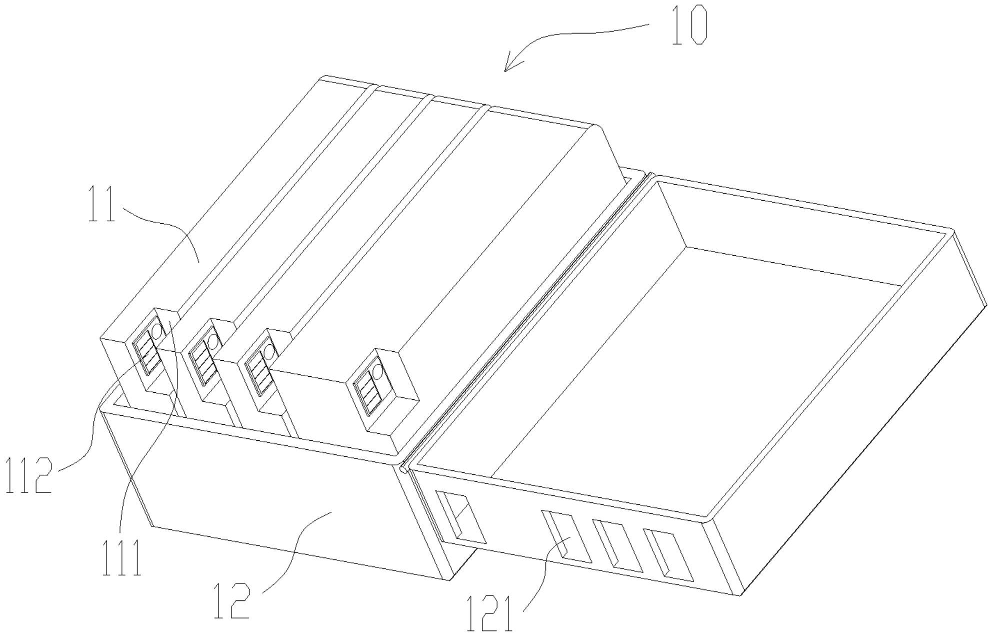
FIG. 2 is a schematic diagram of a cartridge component in an open state in an embodiment of the present disclosure.
Figure 3:
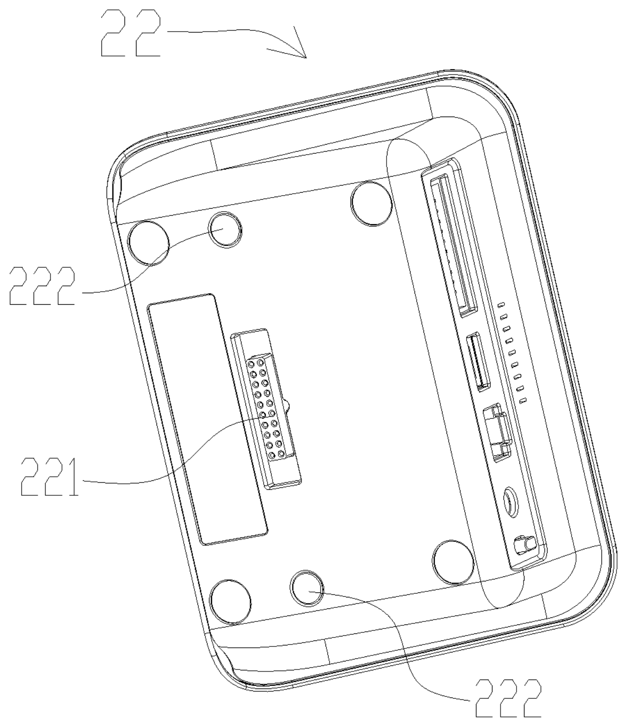
FIG. 3 is a schematic diagram of a data transmission apparatus in a cartridge test device in an embodiment of the present disclosure.
Figure 4:
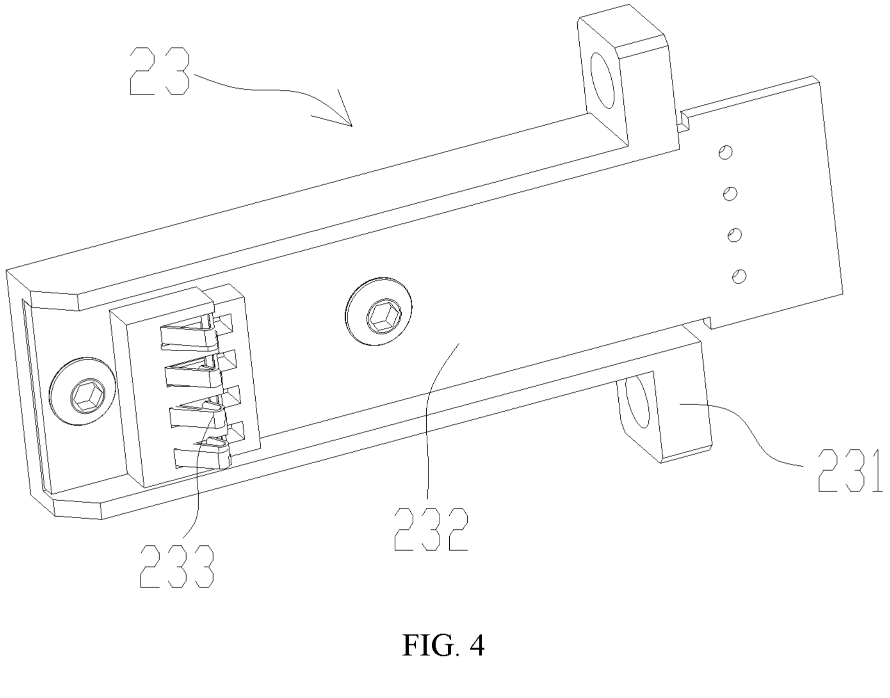
FIG. 4 is a schematic diagram of a test head in a cartridge test device in an embodiment of the present disclosure.

In the drawings, 10 represents a cartridge component; 11 represents a cartridge; 111 represents a chip; 112 represents chip insertion portion; 12 represents a cartridge package; 121 represents an opening; 20 represents a cartridge test device; 21 represents a device main body; 211 represents an electrical connection portion; 22 represents a data transmission apparatus; 221 represents a pinning portion; 222 represents a magnetic member; 23 represents a test head; 231 represents a fixed bracket; 232 represents a PCB board; 233 represents a contact shrapnel; 30 represents a flexible flat cable; 101 represents a mounting bracket; 1011 represents a guide rail; 102 represents a carriage; 1021 represents a mounting groove; 24 represents a position confirmation component; 103 represents a switch lever; 104 represents a trigger switch; 201 represents a mounting plate; 202 represents a fixed base; 204 represents a sliding plate; 205 represents a guide rod; 206 represents a guide sleeve; 207 represents a push rod; 208 represents a pivot frame; and 209 represents a tactile switch.

DETAILED DESCRIPTION

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all of the embodiments. Based on the embodiments of the present disclosure, all other embodiments obtained by one skilled in the art without creative efforts all belong to the scope of protection of the present disclosure.

Unless otherwise defined, all technical and scientific terms used herein have the same meaning as commonly understood by one skilled in the art to which the present disclosure pertains. The terminology used in the description of the present disclosure is for the purpose of describing particular embodiments only and is not intended to limit the disclosure.

Referring to FIG. 1 to FIG. 4, a first embodiment of the present disclosure provides a cartridge test device 20 which includes a device main body 21, a data transmission apparatus 22 mounted on the device main body 21, and a plurality of test heads 23 connected to the device main body 21 and in either or both of electrical connection and signal connection with the data transmission apparatus 22. In the present disclosure, the cartridge test device 20 may be in either or both of electrical connection and signal connection with a plurality of cartridges 11 or a group of cartridges 11 in the cartridge component 10, respectively, by the plurality of test heads 23, such that the cartridge test device 20 is capable of testing the cartridge component 10 when the cartridge test device 20 is in operation. The cartridge test device 20 may test the cartridge component 10 when the cartridge test device 20 is in operation. Specifically, when the cartridge test device 20 is in operation, the cartridge test device 20 is capable of reading or writing codes on chips 111 of the cartridges 11 in the cartridge component 10.

The cartridge component 10 includes a cartridge package 12 and the plurality of cartridges 11 or the group of cartridges 11 accommodated in the cartridge package 12. In an embodiment, the cartridge package 12 is provided with a plurality of openings 121 corresponding to the plurality of cartridges 11. Each of the plurality of openings 121 is configured to allow the test heads 23 to extend in and be in either or both of electrical connection and signal connection with corresponding cartridges 11. Therefore, when the cartridge test device 20 of the present disclosure is in operation, as long as the test heads 23 of the cartridge test device 20 are correspondingly inserted into the plurality of openings 121 of the cartridge package 12, either or both of an electrical connection and a signal connection with the plurality of cartridges 11 or the group of cartridges 11 in the cartridge package 12 may be realized without disassembling the cartridge package 12. The plurality of cartridges 11 refer to cartridges with the same color, and the group of cartridges 11 refers to cartridges with different colors. Either or both of the same data and procedures are required when testing the plurality of cartridges 11, but either or both of different data and procedures are required when testing the group of cartridges 11. In addition, in an embodiment, the cartridge package 12 of the cartridge component 10 may accommodate the plurality of cartridges 11 or the group of cartridges 11, which will not be described in detail herein.

In an embodiment, the cartridges 11 can be fixedly connected with a plurality of chips 111, respectively, and the plurality of chips 111 can be correspondingly disposed on a side of the cartridge package 12 where the openings 121 are provided. In addition, the plurality of test heads 23 of the cartridge test device 20 may extend into the openings 121 and electrically connected with the chips 111 on the corresponding cartridges 11.

Specifically, the cartridges 11 can be provided with chip insertion portions 112, and the chips 111 can be disposed on the cartridges 11 where the chip insertion portions 112 are located. Alternatively, the chip insertion portions 112 on the cartridges 11 in an embodiment can be corresponding to the openings 121 of the cartridge package 12 respectively. Of course, a number of the openings 121 of the cartridge package 12 may also be more than that of the chips 111.

In an embodiment, the data transmission apparatus 22 is detachably connected to the device main body 21. Accordingly, when the cartridge test device 20 of an embodiment is in operation, according to models of cartridges to be tested, by using only one data transmission apparatus 22 and selecting the device main body 21 corresponding to different types of cartridges to be tested, multiple functions of the data transmission apparatus 22 on the cartridge test device 20 may be realized. Meanwhile, when the cartridge test device 20 is damaged, a damaged data transmission apparatus 22 or a damaged device main body 21 may be replaced as required, or a damaged device may be disassembled and repaired, so as to facilitate a subsequent maintenance of the cartridge test device 20.

The data transmission apparatus 22 is disposed on the device main body 21. In an embodiment, the data transmission apparatus 22 is provided with a pinning portion 221, and the device main body 21 is provided with a pin fitting portion (not shown). The data transmission apparatus 22 is connected to the device main body 21 by an insertion cooperation between the pinning portion 221 and the pin fitting portion, thereby realizing an electrical connection or a signal connection between the data transmission apparatus 22 and the device main body 21.

Specifically, in an embodiment, the pinning portion 221 may be male row needle base, and the pin fitting portion may be corresponding female row needle base. Alternatively, the pinning portion 221 may be female row needle base, and the pin fitting portion may be corresponding male row needle base.

In an embodiment, the data transmission apparatus 22 is provided with magnetic members 222, and the device main body 21 is provided with magnetic fitting members (not shown). The data transmission apparatus 22 and the device main body 21 may be connected and fixed with each other by attractions between the magnetic members 222 and the magnetic fitting members. In an embodiment, the data transmission apparatus 22 and the device main body 21 may be detachably connected to each other by the pinning portion and the pin fitting portion. According to the cartridge test device 20 of an embodiment, the data transmission apparatus 22 and the device main body 21 may be fixed to each other by means of magnetic attractions.

Specifically, the number of the magnetic members 222 is two, and two magnetic members 222 are located on both outer sides of the pinning portion 221 respectively. Correspondingly, the number of magnetic fitting portions is two. Of course, the number of the magnetic portions 222 is not limited to those shown in the drawings. One skilled in the art may set the number of the magnetic members 222 to 3, 4, or even more as required. In an embodiment, the magnetic members 222 can be magnets, and the magnetic fitting members can be ferromagnetic, or directly be an outer casing of the device main body 21.

Alternatively, in an embodiment, the data transmission apparatus 22 and the device main body 21 on the cartridge test device 20 are disposed separately. In addition, the data transmission apparatus 22 and the device main body 21 may be connected by a flexible flat cable 30, so as to realize a connection between the data transmission apparatus 22 and the device main body 21.

In an embodiment, the device main body 21 can include an electrical connection portion 211. The flexible flat cable 30 has a first connection end (not shown) and a second connection end (not shown), and the first connection end is inserted and matched with the electrical connection portion 211, and/or the second connection end is inserted and matched with the data transmission apparatus 22. First ends of the test heads 23 may be electrically connected to the electrical connection portion 211, and second ends of the test heads 23 may protrude from the device main body 21, such that the data transmission apparatus 22 and the device main body 21 in the present disclosure may be detachably connected to each other.

In an embodiment, the plurality of test heads 23 are disposed in sequence, and the plurality of test heads 23 are disposed corresponding to the chips 111 of the plurality of cartridges 11 or the group of cartridges 11. In addition, the data transmission apparatus 22 may simultaneously test the plurality of chips 111 by the plurality of test heads 23. That is, the cartridge test device 20 of an embodiment is capable of testing the chips 111 on all of the cartridges 11 in one cartridge package 12, respectively by one operation.

Specifically, in an embodiment, each of the plurality of test heads 23 can include a fixed bracket 231, a PCB board 232 fastened to the fixed bracket 231, and a contact shrapnel 233 electrically connected to the PCB board 232. The contact shrapnel 233 may be fastened to the PCB board 232, and in an embodiment, the contact shrapnel 233 may be fastened to the PCB board 232 by welding. The plurality of test heads 23 may be connected to the chips 111 by the contact shrapnel 233. That is, when the cartridge test device 20 of an embodiment is in operation, the contact shrapnel 233 of the plurality of test heads 23 may be inserted into the chip insertion portions 112 of the cartridges 11 through the openings 121, and may contact and cooperate with the chips 111.

The plurality of test heads 23 are fixedly connected to the device main body 21, or a distance between two adjacent test heads 23 is adjustable. When the distance between the two adjacent test heads 23 is adjustable, the cartridge test device 20 may adjust positions of the plurality of test heads 23 according to types of the cartridges 11 to be tested, so as to be suitable for testing different types of cartridges. Specifically, during adjusting the positions of the plurality of test heads 23, firstly, the test heads 23 are assembled in a flexible manner, for example, the fixed bracket 231 on the plurality of test heads 23 is mounted on a sliding rail (not shown), and then the fixed bracket 231 is fixed with screws. A detail description will not be provided herein.

In an embodiment, the cartridge test device 20 may further include a mounting bracket 101, a guide rail 1011, and a carriage 102. The guide rail 1011 is protruded from the mounting bracket 101, and fixedly connected to the mounting bracket 101. The carriage 102 is slidably connected to the guide rail 1011. The carriage 102 is capable of driving the cartridge 11 to be tested to move along a direction of the guide rail 1011 towards the plurality of test heads 23, so that the chips 111 of a plurality of cartridges or a group of cartridges are in either or both of electrical connection and signal connection with corresponding test heads 23.

It can be understood that when the chips 111 of the cartridges 11 on the cartridge component 10 are connected to the plurality of test heads 23, the plurality of test heads 23 need to pass through the openings 121 of the cartridge package 12 to be accurately connected with corresponding chips 111 of the cartridges 11. Therefore, in order to ensure cooperation between the plurality of test heads 23 and the chips 111, in an embodiment, the carriage 102 is provided with a mounting groove 1021. The cartridge package 12 of the cartridge component 10 is correspondingly disposed on the carriage 102 where the mounting groove 1021 is located, so as to realize a confirmation of an installation position of the cartridge component 10 on the carriage 102.

In an embodiment, the cartridge test device 20 may further include a position confirmation component 24 provided between the carriage 102 and the device main body 21. The position confirmation component 24 may be in either or both of electrical connection and signal connection with the data transmission apparatus 22. When the carriage 102 slides until the plurality of test heads 23 are properly in either or both of electrical connection and signal connection with the chips 111 of the cartridges 11, the position confirmation component 24 is configured to trigger the data transmission apparatus 22, so as to transfer either or both of data and programs to the chips 111 by the plurality of test heads 23, or to read either or both of data and programs in the chips 111 by the plurality of test heads 23.

Specifically, the position confirmation component 24 may include a switch lever 103 connected to the carriage 102 and a trigger switch 104 connected to the device main body 21. When the carriage 102 slides until the plurality of test heads 23 are properly in either or both of electrical connection and signal connection with the chips 111, the switch lever 103 is capable of triggering the trigger switch 104, and the trigger switch 104 is capable of transmitting a position signal of the plurality of test heads 23 properly in either or both of electrical connection and signal connection with the chips 111 to the data transmission apparatus 22.

Figure 5:
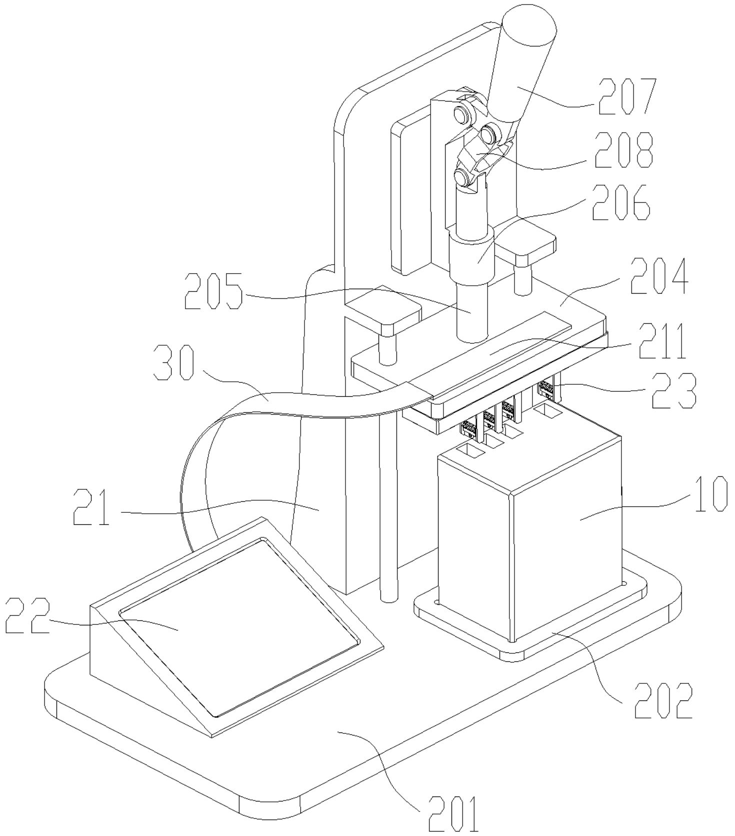
FIG. 5 is a schematic diagram of a cartridge test device of a cartridge component in a second embodiment of the present disclosure.
Figure 6:
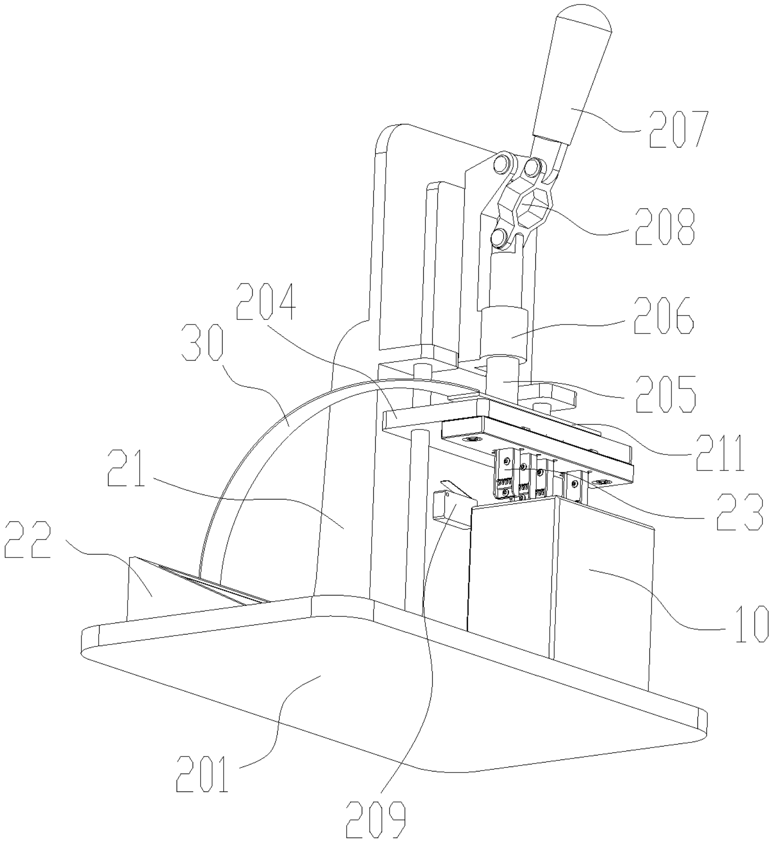
FIG. 6 is a schematic diagram of the cartridge test device in another view angle in a second embodiment of the present disclosure.

Referring to FIG. 5 and FIG. 6, according to a cartridge test device provided by a second embodiment of the present application, structures of a cartridge component 10 and a plurality of test heads 23 in this embodiment are the same as those of the cartridge component 10 and the plurality of test heads 23 in the first embodiment of the present application. In addition, during operation, an operation principle of a cartridge test device 20 for testing chips 111 of the cartridges 11 on the cartridge component 10 in the second embodiment of the present application is the same as that in the first embodiment of the present application. In addition, the cartridge test device of the second embodiment differs from that of the first embodiment in that the cartridge test device in the second embodiment is connected to the chips 111 of the cartridges 11 on the cartridge component 20 by driving the plurality of test heads 23 to move.

Specifically, the cartridge test device of the second embodiment includes a mounting plate 201 and a fixed base 202 fastened to the mounting plate 201. The cartridge component 10 is disposed on the fixed base 202 and the device main body 21 is disposed on the mounting plate 201 and movably connected with a sliding plate 204. The plurality of test heads 23 are fastened to the sliding plate 24, and the sliding plate 204 is capable of driving the plurality of test heads 23 to move towards the cartridge component 10, so that the plurality of test heads 23 may be connected to corresponding chips 111.

In an embodiment, the sliding plate 204 is fastened to a guide rod 205. The device main body 21 is connected to a guide sleeve 206 correspondingly. The guide rod 205 is slidably connected to the guide sleeve 206 to guide a movement of the sliding plate 204. A pushing rod 207 is rotatably connected to the device main body 21. A pivot frame 208 is connected between the pushing rod 207 and the guide rod 205. In addition, the pushing rod 207 is capable of driving the sliding plate 204 to move towards the cartridge component 10 by the pivot frame 208 and the guide rod 205.

Furthermore, the device main body 21 is provided with a tactile switch 209. When the sliding plate 204 moves, the sliding plate 204 is capable of touching the tactile switch 209 to send a feedback signal, so as to confirm that the test heads 23 are connected to the corresponding chips 111. Of course, it should be noted that the feedback signal configured to confirm connections between the plurality of test heads 23 and the corresponding chips 111 is not limited to the tactile switch 209 shown in the drawings. One skilled in the art may use a proximity switch as required. A detail description will not be provided herein.

According to the present disclosure, a cartridge component test method is further provided. The cartridge component test method includes the following steps:

- at step 1, providing the cartridge test device 20 and the cartridge component 10 described above;
- at step 2, inputting either or both of data and programs required by the plurality of cartridges 11 or the group of cartridges 11 into the data transmission apparatus 22;
- at step 3, either or both of driving the cartridge component 10 to close to the plurality of test heads 23 and driving the plurality of test heads 23 close to the cartridge component 10, so that the plurality of test heads 23 are in either or both of electrical connection and signal connection with corresponding chips 111 of the plurality of cartridges 11 or the group of cartridges 11;

at step 4, the data transmission apparatus 22 reading or writing either or both of data and programs of corresponding chips 111 of the plurality of cartridges 11 or the group of cartridges 11 by the plurality of test heads 23; and at step 5, either or both of driving the cartridge component 10 away from the plurality of test heads 23 and driving the plurality of test heads 23 away from the cartridge component 10, so that the plurality of test heads 23 are away from corresponding chips 111 of the plurality of cartridges 11 or the group of cartridges 11, thus finishing the test.

In an embodiment, the driving the cartridge component 10 close to the plurality of test heads 23 includes: disposing the cartridge component 10 to the carriage 102, and driving the carriage 102 to slide on the mounting bracket 101 fastened to the cartridge test device 20 along the guide rail 1011. The driving the plurality of test heads 23 close to the cartridge component 10 includes: fixing the cartridge component 10 to the fixed base 202, enabling the plurality of test heads 23 of the cartridge test device 20 to be fastened to the sliding plate 204, and driving the sliding plate 204 to move towards the cartridge component 10.

In summary, the present disclosure provides the cartridge test device, the cartridge component, and the cartridge component test method. In the present disclosure, the cartridge test device is simple in structure and convenient in operation. Because the plurality of test heads on the cartridge test device are in either or both of electrical connection and signal connection with the plurality of cartridges in the cartridge component, the plurality of cartridges may be simultaneously tested when the cartridge test device is in operation may be realized. Therefore, an operation efficiency of the cartridge test device for a cartridge testing may be improved and a testing cost may be reduced. Meanwhile, the plurality of cartridges or the group of cartridges of the cartridge component may be matched with the plurality of test heads of the cartridge test device and tested by the cartridge test device without disassembling the cartridge package, thereby further improving an operation efficiency of the cartridge test device.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. An ink cartridge test device configured to test an ink cartridge component, wherein the ink cartridge component comprises an ink cartridge package and a plurality of ink cartridges or a group of ink cartridges accommodated in the ink cartridge package, the plurality of ink cartridges refer to ink cartridges with a same color, the group of ink cartridges refers to ink cartridges with different colors, the ink cartridge package is provided with a plurality of openings corresponding to the plurality of ink cartridges or the group of ink cartridges, and the ink cartridge test device comprises:

a device main body;

a data transmission apparatus mounted on the device main body and in either or both of electrical connection and signal connection with the device main body; and a plurality of test heads connected to the device main body and in either or both of electrical connection and signal connection with the data transmission apparatus, wherein the plurality of openings are configured to allow the plurality of test heads to reach in and be in either or both of electrical connection and signal connection with corresponding ink cartridges;

the ink cartridge test device further comprises a mounting bracket, a guide rail and a carriage, wherein the guide rail is protruded from the mounting bracket and fixedly connected to the mounting bracket, the carriage is slidably connected to the guide rail, the ink cartridge package is disposed on the carriage, and the carriage is capable of driving the ink cartridge package to move along a direction of the guide rail towards the plurality of test heads, enabling a chip of the ink cartridges to be in either or both of electrical connection and signal connection with a corresponding test head;

the ink cartridge test device further comprises a position confirmation component provided between the carriage and the device main body, wherein the position confirmation component is in either or both of electrical connection and signal connection with the data transmission apparatus, and when the carriage slides until the plurality of test heads are properly in either or both of electrical connection and signal connection with the chip of the ink cartridges, the position confirmation component is configured to trigger the data transmission apparatus to transfer either or both of data and programs to the chip by the plurality of test heads, or to read either or both of data and programs in the chip by the plurality of test heads.

2. The ink cartridge test device of claim 1, wherein each of the plurality of test heads comprises a fixed bracket, a PCB board fastened to the fixed bracket, and a contact electrode electrically connected to the PCB board; and each of the plurality of test heads is capable of being electrically connected to a chip of the ink cartridges by the contact electrode.

3. The ink cartridge test device of claim 1, wherein the plurality of the test heads are fixedly connected to the device main body, or a distance between two adjacent test heads is adjustable.

4. The ink cartridge test device of claim 1, wherein the position confirmation component comprises a switch lever connected to the carriage and a trigger switch connected to the device main body, when the carriage slides until the plurality of test heads are properly in either or both of electrical connection and signal connection with the chip, the switch lever is capable of triggering the trigger switch, and the trigger switch is capable of transmitting a position signal of the plurality of test heads properly in either or both of electrical connection and signal connection with the chip to the data transmission apparatus.

5. The cartridge test device of claim 1, further comprising a mounting plate and a fixed base fastened to the mounting plate, wherein the fixed base is configured to locate the cartridge, the device main body is disposed on the mounting plate and movably connected with a sliding plate, the plurality of test heads are fastened to the sliding plate, and the sliding plate is capable of driving the plurality of test heads to move towards the cartridge, enabling the plurality of test heads being in either or both of electrical connection and signal connection with the cartridge.

6. The cartridge test device of claim 5, wherein the sliding plate is fastened to a guide rod, the device main body is connected to a guide sleeve correspondingly, and the guide rod is slidably connected to the guide sleeve, wherein a pushing rod is rotatably connected to the device main body, the pushing rod is connected to the guide rod by a pivot frame, and the pushing rod is capable of driving the sliding plate to move towards the cartridge by the pivot frame and the guide rod.

7. An ink cartridge component, comprising an ink cartridge package and a plurality of ink cartridges or a group of ink cartridges accommodated in the ink cartridge package, wherein the plurality of ink cartridges or the group of ink cartridges are tested by the ink cartridge test device of claim 1, the ink cartridge test device comprises the plurality of test heads, and the plurality of test heads are capable of being in either or both of electrical connection and signal connection with the plurality of ink cartridges or the group of ink cartridges respectively.

8. An ink cartridge component test method, comprising the following steps:

at step 1, providing the ink cartridge test device and the ink cartridge component of claim 7;

at step 2, inputting either or both of data and programs required by the plurality of ink cartridges or the group of ink cartridges into the data transmission apparatus;

at step 3, either or both of driving the ink cartridge component close to the plurality of test heads and driving the plurality of test heads close to the ink cartridge component, enabling the plurality of test heads to be in either or both of electrical connection and signal connection with corresponding chips of the plurality of ink cartridges or the group of ink cartridges;

at step 4, the data transmission apparatus reading or writing either or both of data and programs of corresponding chips of the plurality of ink cartridges or the group of ink cartridges by the plurality of test heads; and at step 5, either or both of driving the ink cartridge component away from the plurality of test heads and driving the plurality of test heads away from the ink cartridge component, enabling the plurality of test heads away from corresponding chips of the plurality of ink cartridges or the group of ink cartridges and finishing the test.

9. The ink cartridge component test method of claim 8, wherein the driving the ink cartridge component close to the plurality of test heads comprises:

disposing the ink cartridge component to a carriage, and driving the carriage to slide on the mounting bracket fastened to the ink cartridge test device along the guide rail.

10. The cartridge component test method of claim 8, wherein the cartridge test device further comprises a mounting plate and a fixed base fastened to the mounting plate, wherein the fixed base is configured to locate the cartridge, the device main body is disposed on the mounting plate and movably connected with a sliding plate, the plurality of test heads are fastened to the sliding plate, and the sliding plate is capable of driving the plurality of test heads to move towards the cartridge, enabling the plurality of test heads being in either or both of electrical connection and signal connection with the cartridge;

the driving the plurality of test heads close to the cartridge component comprises:

fixing the cartridge component to the fixed base, enabling the plurality of test heads of the cartridge test device to be fastened to the sliding plate, and driving the sliding plate to move towards the cartridge component.

* * * * *